United States Patent [19]

Stuhrmann

[11] Patent Number: 4,518,305

[45] Date of Patent: May 21, 1985

[54] VEHICLE-MOUNTED APPARATUS FOR SUPPORTING BALLAST WEIGHTS AND FOR ELEVATING THE WEIGHTS

[75] Inventor: Heinz Stuhrmann, Schwetzingen, Fed. Rep. of Germany

[73] Assignee: Deere & Company, Moline, Ill.

[21] Appl. No.: 446,934

[22] Filed: Dec. 6, 1982

[30] Foreign Application Priority Data

Dec. 29, 1981 [EP] European Pat. Off. ........ 81110815.8

[51] Int. Cl.³ ............................................... B66F 9/00
[52] U.S. Cl. .................................... 414/719; 212/196; 280/755; 280/758
[58] Field of Search ................ 414/719; 280/758, 759, 280/755, 479 R, 461 A, 714; 91/361; 212/196

[56] References Cited

U.S. PATENT DOCUMENTS

| | | | |
|---|---|---|---|
| 3,953,040 | 4/1976 | Unruh | 280/714 X |
| 4,133,552 | 1/1979 | Sheine | 280/479 R X |
| 4,232,883 | 11/1980 | Bourgeous et al. | 280/759 |
| 4,344,733 | 8/1982 | Hirsch | 414/694 |
| 4,363,412 | 12/1982 | Patel et al. | 212/196 |
| 4,424,870 | 1/1984 | Weiss | 280/461 A X |

Primary Examiner—Robert J. Spar
Assistant Examiner—Donald W. Underwood

[57] ABSTRACT

A tractor-mounted apparatus is disclosed for supporting ballast weights on the front or rear of the tractor and for elevating the weights relative to the ground. The apparatus includes a pair of U-shaped channels fastened to frame members of the tractor in an upright position. The channels are aligned with their open faces opposite to one another such that the ballast weights can be received therebetween. A pair of hydraulic cylinders are each secured at one end to one of the U-shaped channels and each has an outwardly extending piston rod detachably coupled at its lower end to the ballast weights. The piston rods are moved into and out of the hydraulic cylinders by a control mechanism thereby permitting the ballast weights to be raised and lowered in a substantially vertical fashion. The apparatus also includes means for permanently locking the ballast weights to the U-shaped channels while the ends of the piston rods are connected to the lower links of an attached implement. In such an arrangement, actuation of the piston rods permits the implement to be raised and lowered with respect to the tractor's frame.

10 Claims, 6 Drawing Figures

VEHICLE-MOUNTED APPARATUS FOR SUPPORTING BALLAST WEIGHTS AND FOR ELEVATING THE WEIGHTS

FIELD OF THE INVENTION

This invention relates to a vehicle-mounted apparatus for supporting ballast weights and for elevating the weights relative to the ground and more particularly, to an apparatus for supporting ballast weights on the front of an agricultural tractor.

BACKGROUND OF THE INVENTION

It is well known to attach ballast weights to the front or rear of agricultural and/or earth-working vehicles so as to provide better traction and steering capabilities. On most tractors, there is a base weight which is fixed to the frame and means for adding additional weights to achieve the correct ballasting. For most agricultural tractors, it is necessary for the operator to attach and remove additional weights from time to time depending upon the desired operation of his tractor. The weights are both heavy and cumbersome and present a problem in being assembled. One solution to the problem is mentioned in U.S. Pat. No. 3,595,410, issued to N. Lemmon, in 1971 wherein a cylinder is used to raise and lower the weight relative to the tractor frame. However, there is still a problem in that sometimes the operator is unable to detach the weights from the vehicle before the vehicle is driven at an increased speed on a public highway. During such travel, it is common for the vehicle to experience serious pitching, excessive dynamic loading and bad steering due to the resonant oscillation of the ballast weights. Therefore, there is a desire in the industry to provide a mechanism which will enable the ballast weights to be raised and lowered relative to the frame of the vehicle as well as to be coupled in such a manner as to reduce the resonant oscillation of the tractor when driven over a hard surface.

Now a vehicle-mounted apparatus has been invented which will accomplish both objectives.

SUMMARY OF THE INVENTION

Briefly, this invention relates to a vehicle-mounted apparatus for supporting ballast weights on the front or rear of a vehicle and for enabling the weights to be elevated relative to the ground. The apparatus includes a pair of U-shaped channels fastened to the frame member of the vehicle in an upright position. The U-shaped channels are aligned opposite to one another for receiving the ballast weights therebetween. A pair of hydraulic cylinders are secured at one end to the U-shaped channels and each has an outwardly extending piston rod which can be attachably coupled to the ballast weights. The apparatus further includes locking means for locking the weights to the frame of the tractor as well as control means for moving the piston rods into and out of the hydraulic cylinders to raise and lower the ballast weights. The ballast weights are raised and lowered with respect to the ground in a substantially vertical fashion.

The general object of this invention is to provide a vehicle-mounted apparatus for supporting ballast weights at either the front or rear thereof and for elevating the weights relative to the ground. A more specific object of this invention is to provide an apparatus for supporting ballast weights on the front of an agricultural tractor and having the ability to raise or lower the weights in a substantially vertical fashion.

Another object of this invention is to provide a tractor-mounted apparatus for supporting ballast weights and for elevating the weights relative to the ground in an easy and safe fashion.

Still another object of this invention is to provide a vehicle-mounted apparatus for supporting ballast weights in such a fashion that the weights will dampen resonant oscillations imparted into the vehicle while it travels over a hard surface.

A further object of this invention is to provide a tractor-mounted apparatus for both supporting and elevating ballast weights and for operating an attached implement.

Still further, an object of this invention is to provide a tractor-mounted apparatus which enables ballast weights to be attached and detached readily and quickly.

Other objects and advantages of the present invention will become more apparent to those skilled in the art in view of the following description and the accompanying drawings.

DETAILED DESCRIPTION OF THE PREFERRED EMBODIMENTS

Figure 1:
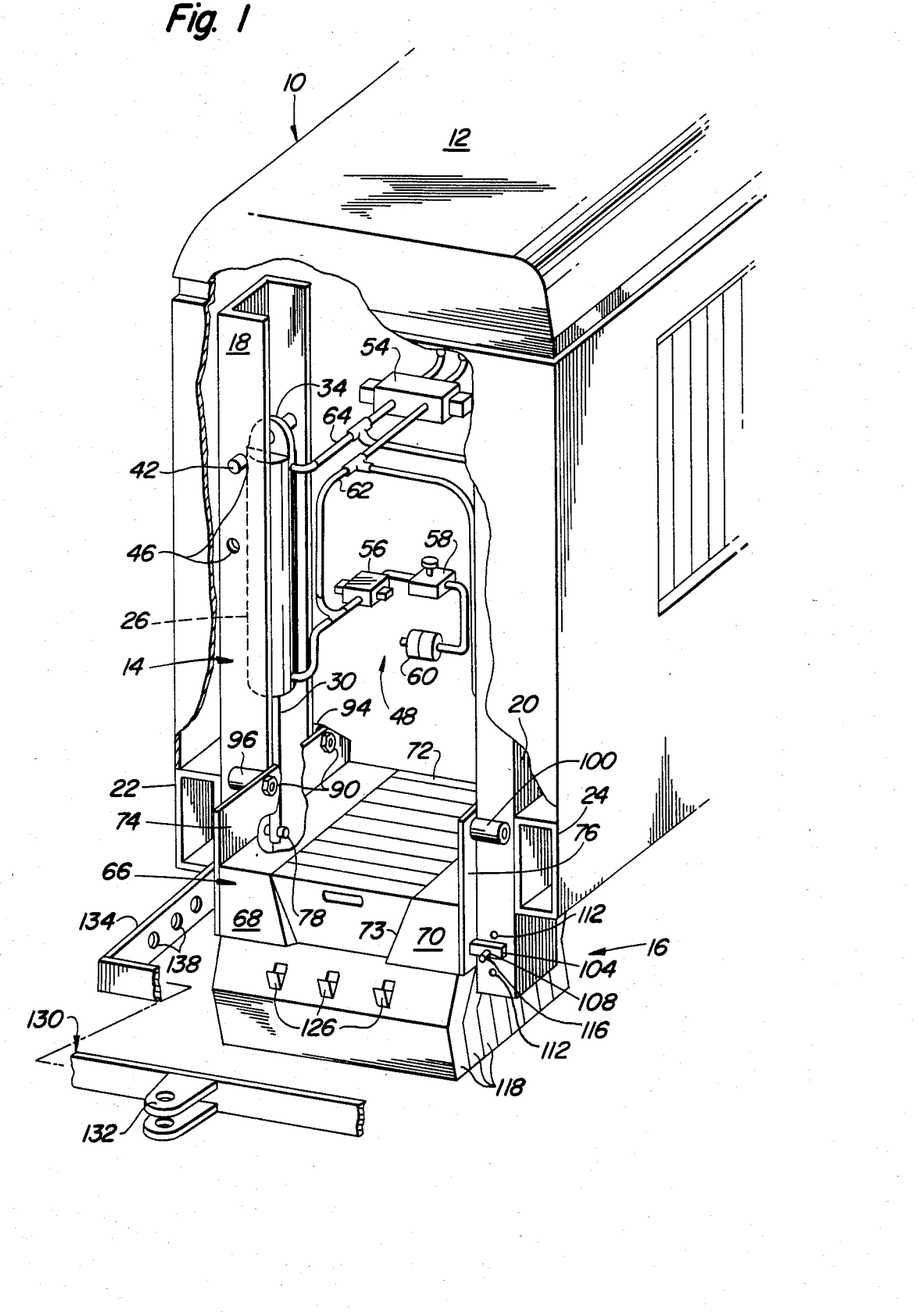
FIG. 1 is a perspective front view of the vehicle-mounted apparatus, including ballast weights, installed on the front of an agricultural tractor.

Referring to FIG. 1, a vehicle 10, such as an agricultural tractor, is shown having a cowling 12 partially broken away thereby revealing a lifting apparatus 14 which both supports and lifts a ballast weight assembly 16. The lifting apparatus 14 includes a guide frame made up of two upright channels 18 and 20 which are secured in an upright manner to frame members 22 and 24, respectively, of the vehicle 10. The pair of channels 18 and 20 are preferably U-shaped in configuration and are arranged substantially vertical such that the open faces of each channel face each other.

Figure 2:
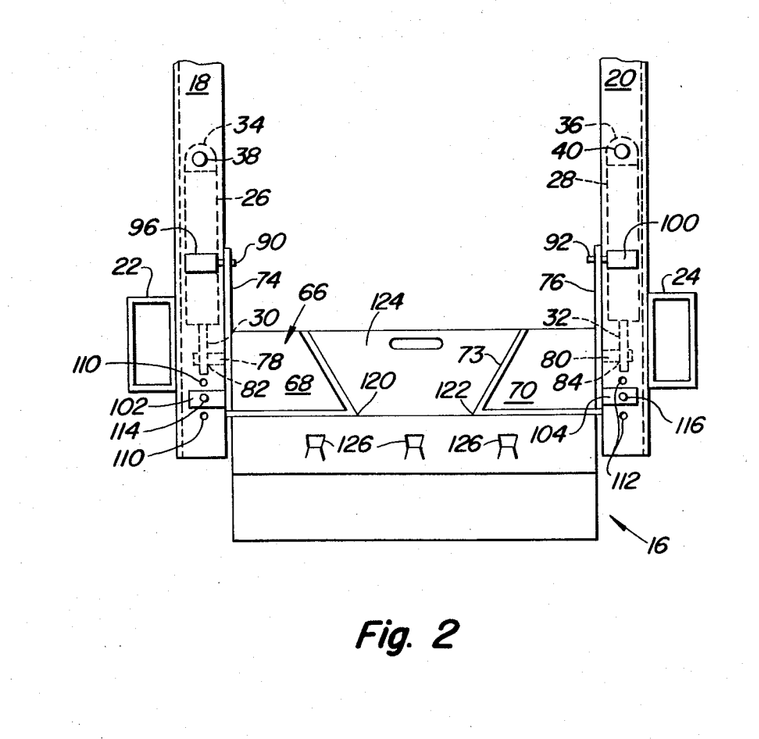
FIG. 2 is a front view of the vehicle-mounted apparatus shown in FIG. 1 with the front yoke removed.

Positioned within each of the channels 18 and 20 is a double-acting hydraulic cylinder 26 and 28 respectively, see FIG. 2, each of which includes a piston rod 30 and 32 which extend out of the lower end of the respective cylinders. The upper end of each cylinder 26 and 28 contains a lug 34 and 36, respectively, through which is formed an eye 38 and 40. Pins 42 and 44, see FIGS. 1 and 3, extend through the eyes 38 and 40 of the pistons 26 and 28 and are received in one of a plurality of apertures 26 formed in the channel members 18 and 20. By providing a plurality of vertically spaced apertures 46 in the flange members of each channel 18 and 20, the hydraulic cylinders 26 and 28 can be vertically adjusted to provide a more versatile system.

Figure 5:
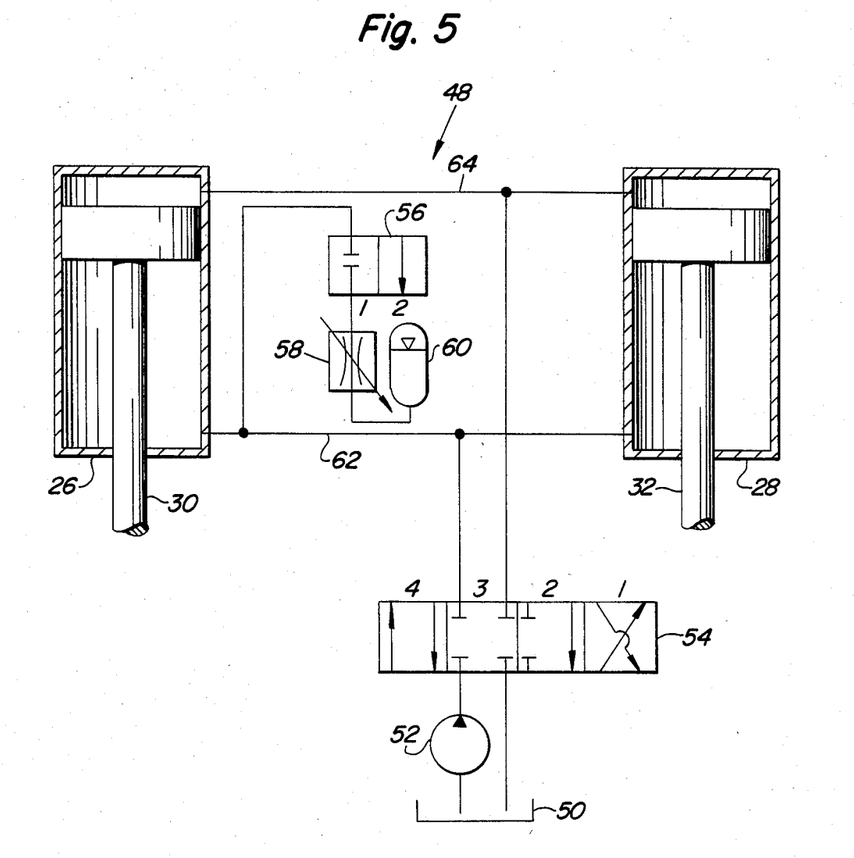
FIG. 5 is one embodiment of a hydraulic circuit diagram for actuating the vehicle-mounted apparatus.

The hydraulic cylinders 26 and 28 are connected to a hydraulic system 48, see FIG. 5, which controls the stepless vertical movement of the ballast weight assembly 16 and also provides oscillation damping in respect to the vertical oscillating movement of the ballast weight assembly 16 under the influence of pitching of the vehicle 10. The hydraulic system 48 includes a reservoir 50, a pump 52, a four-way four position valve 54, a two-way two position valve 56, an adjustable throttle valve 58 and an accumulator 60. The system further includes first and second hydraulic lines 62 and 64 which are connected to the hydraulic cylinders 26 and 28 to raise and lower them respectively.

The first and second lines 62 and 64 connect the hydraulic cylinders 26 and 28 in parallel such that both will move in the same direction simultaneously. It should be noted that although two cylinders have been described thus far for the lifting apparatus 14, it is possible to obtain the same results using only a single cylinder.

In FIG. 5, the four-way valve 54 is shown having four positions labeled 1, 2, 3 and 4 and the two-way valve 56 is shown as having two positions labeled 1 and 2. In the illustrated position 3 of the four-way valve 54, fluid flow from the pump 52 is blocked as well as the reverse flow of fluid to the reservoir 50. When the four-way valve 54 is in the third position, the first and second line 62 and 64 are isolated from the pump 52 and the reservoir 50 thereby enables the hydraulic cylinders 26 and 28 to be locked in a fixed position while the two-way valve 56 remains closed. When the four-way valve 54 is shifted to position 4 and the two-way valve 56 remains closed, the piston rods 30 and 32 will move upwards into the respective cylinders 26 and 28 thereby raising the ballast weight assembly 16 relative to the ground. When the four-way valve 54 is in position 1 and the two-way valve 56 is closed, the piston rods 30 and 32 will move downwards out of the respective cylinders 26 and 28, thereby lowering the ballast weight assembly 16. Lastly, when the four-way valve 54 is in position 2, the hydraulic system 48 is switched to a vibration damping mode and the two-way valve 56 is moved to its second or open position simultaneously with the movement of the four-way valve 54. In this position, the second line 64 is vented to the reservoir 50 while the first line 62 is connected to the accumulator 60 via the adjustable throttle valve 58. The ballast weight assembly 16, which is pivotally connected to the lower ends of the piston rods 30 and 32, as will be explained shortly, are then used as damping weights. The hydraulic system 48 acts as a damping means by virtue of the "spring" effect of the accumulator 60 and the "friction" of the throttle valve 58.

The throttle valve 58 permits adjustable damping of the ballast weight assembly 16 thereby providing for optimum effect of the system. In particular, the throttle valve 58 permits adjustment to provide proper damping for various load conditions under which the vehicle is placed and also for the various types of road surfaces over which the vehicle traverses. The use of the hydraulic system 48 to provide both lifting movement and also to provide damping can be achieved by various control circuits. One such circuit includes an automatic control for the two-way valve 56, for example an electro-magnet, such that it will remain in position 1 for positions 1, 3 and 4 of the four-way valve 54 and will move to position 2 when the four-way valve 54 moves to its position 2. The four-way valve 54 on the other hand is preferably operated manually by a lever located in the vehicle's cab or on the outside of the vehicle. The lever (not shown) enables the operator to view the movement of the ballast weight assembly 16 so that it corresponds directly to the physical movement of the lever.

Referring now to FIGS. 1–4, the ballast weight assembly 16 includes a support frame 66 made up of two side members 68 and 70 which are arranged parallel to each other and which are connected together by an end plate 72. The space between the side members 68 and 70 forms a downwardly tapering trapezoid, for example a dove-tail slot 73, which provides a means for adding additional weight onto the ballast weight assembly 16. The side members 68 and 70 also have securely affixed to their outer longitudinal sides, upstanding side plates 74 and 76. Each of the side plates 74 and 76, which can be welded to the respective side members 68 and 70, contains an outwardly extending pin 78 and 80 respectively. The pins 78 and 80, see FIG. 2, engage in apertures 82 and 84 respectively, formed in the lower ends of the piston rods 30 and 32. Each of the side plates 74 and 76 further includes a pair of bores 86 and 88, see FIG. 3, which receive a pair of pins 90 and 92 on which are journaled a pair of guide rollers 94, 96 and 98, 100 respectively. Each pair of guide rollers 94, 96 and 98, 100 straddles the corresponding upright channel 18 and 20, see FIG. 1, and guides the ballast weight assembly 16 for vertical movement. Although only one pair of guide rollers are shown attached to each side plate 74 and 76, it is possible to attach additional rollers if so desired. Likewise, it is possible to use guide rail members instead of guide rollers.

Figure 3:
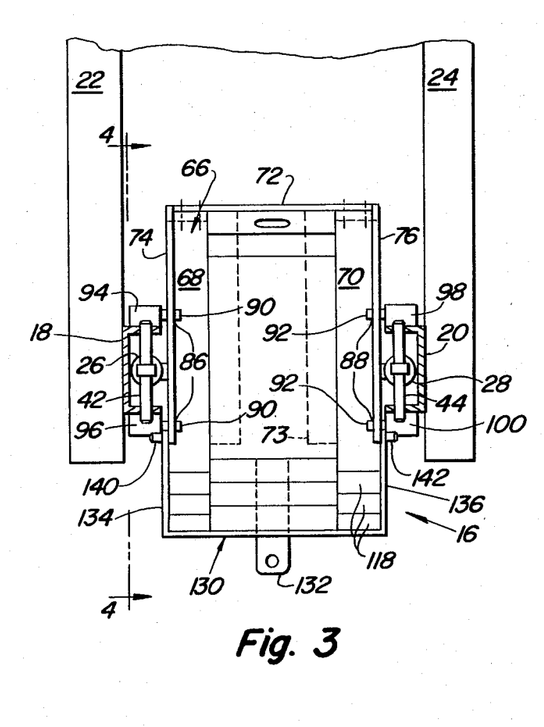
FIG. 3 is a plane view of the vehicle-mounted apparatus.
Figure 4:
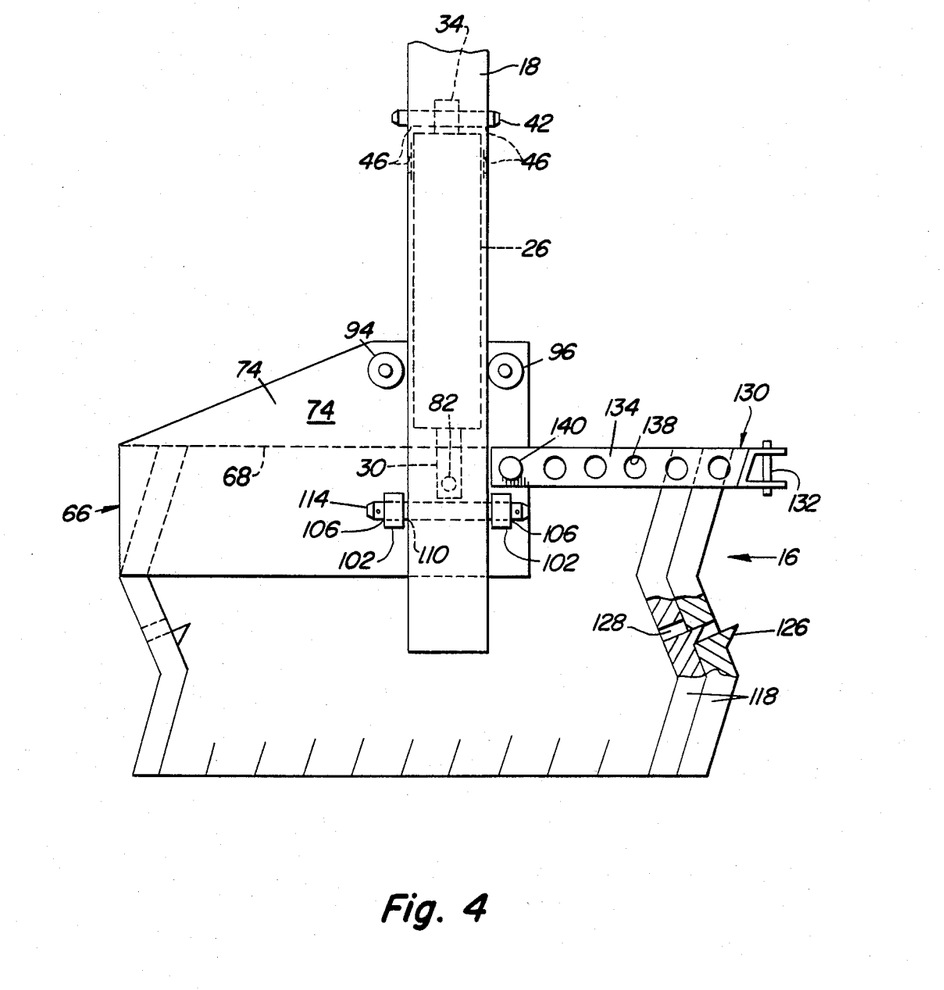
FIG. 4 is a side view of the vehicle-mounted apparatus taken along the line 4—4 of FIG. 3.

The ballast weight assembly 16 further includes front and rear stub bars 102, see FIG. 4, secured to the outer surface of the end plate 74 and front and rear stub bars 104 secured to the outer surface of the side plate 76. Each of the stub bars 102 and 104 contains a bore 106 and 108, respectively, formed therethrough. The bores 106 and 108 match up with bores 110 and 112, respectively, formed on the flanges of the channels 18 and 20. Preferably, there are a plurality of bores 110 and 112 formed on the channels 18 and 20 respectively, which are disposed one above the other. When the ballast weight assembly 16 is adjusted to a height at which the bores 106 and 108 register with the bores 110 and 112, pins 114 and 116 can be inserted therethrough so that the ballast weight assembly 16 is rigidly connected to the channels 18 and 20, as may be best seen in FIGS. 2 and 4.

Referring now to FIG. 4, additional weight 118 can be attached to the ballast weight assembly 16 via the support frame 66. Each additional weight 118 has a configuration which includes a flattened Z-shaped cross section in side view and has V-shaped recesses 120 and 122 which form the top part of the weight 118 into a dove-tail tongue 124, see FIG. 2. The dove-tail tongue 124 enables the additional weights 118 to be slid into the aforementioned dove-tail slot 73 formed in the support frame 66. Accordingly, each additional weight 118 is positively fixed with respect to the support frame 66. The additional weights 118 will contact and rest against one another by virtue of their cross-sectional configuration thereby approximating a unitary mass. In addition, a secondary alignment and connection is provided by front projections 126 which engage in recesses 128. As depicted in FIG. 4, each recess 128 is shown as a bore which extends through each additional weight 118 and is larger than the front projection 126. This difference in size facilitates the interconnection of one additional weight to another even if dirt or other debris has accumulated in the recess 128.

Returning to FIG. 1, the support frame 66 also includes a yoke 130 which completes the fourth side of the support frame 66 and which has a towing clevis 132 mounted approximately on the front center thereof. The yoke 130 includes side arms 134 and 136 (see FIG. 3) both of which contain a plurality of apertures 138 which enable the yoke 130 to be pinned or bolted to the side plates 74 and 76 by bolts 140 and 142. The apertures 138 can be selected in accordance with the number of additional weights 118 such that the front bar of the yoke 130 abuts against the most outward extending front weight 118. The additional weights 118 are thereby locked in place, especially extra front weights as shown in FIG. 3 which are supported solely by the projections 126 and the recesses 128. The method of attaching the yoke 130 to the side plates 74 and 76 also ensures that the clevis 132 is mounted such as to have adequate strength for the draw loads which it has to handle.

When a tractor is operating in the field, which has an implement attached to a rear-mounted three-point hitch, it is sometimes desirable to increase the ballast weight on the front of the tractor in order to improve the traction forces and the steering. When the tractor is equipped with the apparatus 14 of this invention, the adding of additional weights 118 to the ballast weight assembly 16 can be done very easily and rapidly. Once the operator has secured the additional weights 118 onto the support frame 66, the hydraulic cylinders 26 and 28 are raised via the hydraulic control system 48 to a position wherein the pins 114 and 116 are passed through the bores 106 and 108 formed in the stud bars 102 and 104 and through the bores 110 and 112 formed in the channels 18 and 20.

When the agricultural tractor, which may or may not include an attached implement, is transported over a hard surface or a bumpy road, there is a likelihood that additional dynamic wheel loading will result. When this happens, the front axle of the tractor will be loaded and then unloaded such that a detrimental effect occurs effecting the steering ability. In this situation, the additional weights 118 can be used to act as damping weights thereby permitting substantial improvements to be achieved. To this end, the rigid connection between the support frame 66 and the channeled uprights 18 and 20 is released by removing the pins 114 and 116 from the stud bars 102 and 104 respectively. The support frame 66 will still be connected to the ends of the piston rods 30 and 32 by means of the pins 78 and 80. If both the four-way valve 54 and the two-way two position valve 56 are moved into their second positions, the hydraulic system 48 is switched to the damping mode. In this mode the ballast weight assembly 16, which is coupled to the hydraulic cylinders 26 and 28, is utilized as a damping weight. The oscillating movement of the ballast weight assembly 16 on the vehicle 10 in a vertical direction under the influence of pitching of the vehicle during transportation thereof is thus damped.

Figure 6:
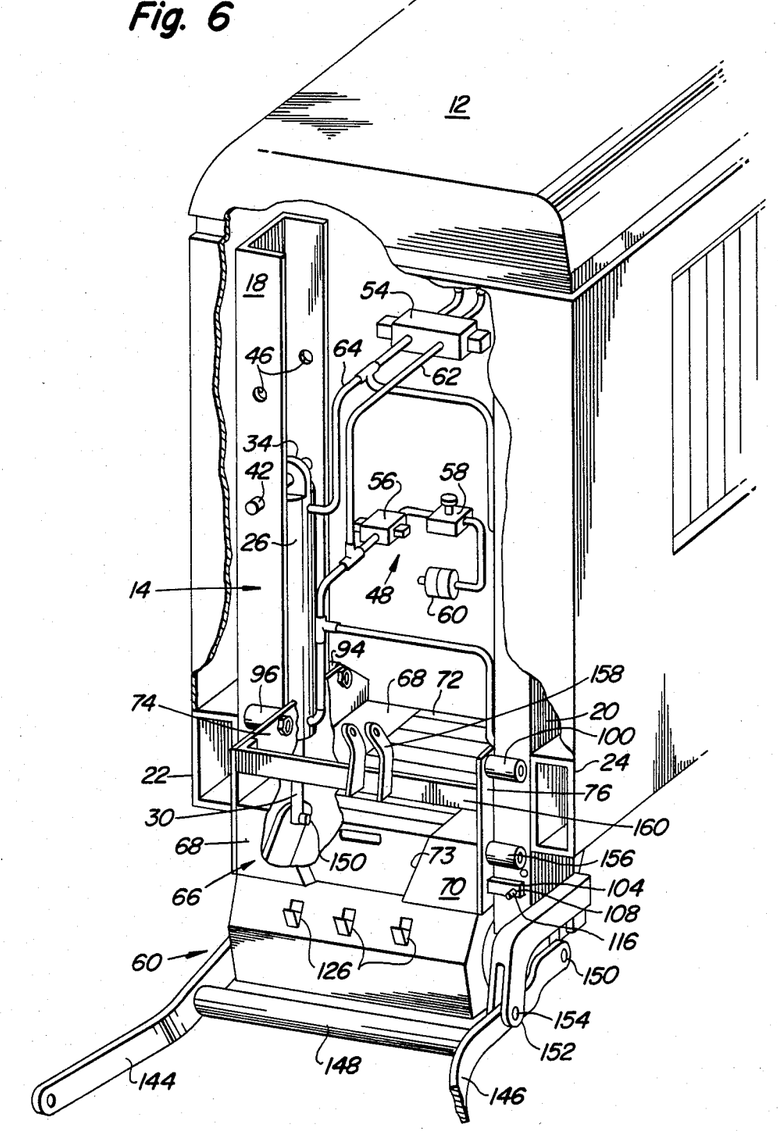
FIG. 6 is a perspective front view of an alternative embodiment of the vehicle-mounted apparatus showing multiple rollers fixed to the support frame and adapted for elevating an attached implement.

Referring to FIG. 6, an alternative embodiment is shown wherein the apparatus 14 is converted to act as an implement lift, for example, for a front-end mounted implement. In FIG. 6, the ballast weight assembly 16 is fixed to the channel uprights 18 and 20 as described above and the coupling pins 78 and 80 have been removed to uncouple the piston rods 30 and 32 from the weight assembly 16. The hydraulic cylinders 26 and 28 can now act as lift cylinders for a pair of lower links 144 and 146 which are connected together by a cross bar 148. The rear ends of the links 144 and 146 are connected to the piston rods 30 and 32 respectively, by pins 150. The lower links 144 and 146 are pivotally mounted, somewhat forward of the pins 150, in forked brackets 152 (only one of which is shown) fixed to the outer surfaces of the channel uprights 18 and 20. Pivot pins 154 pass through the forked brackets 152 and the lower links 144 and 146 so as to form a pivotal connection therewith. As shown in FIG. 6, the forked brackets 152 can be permanently attached to the upright channels 18 and 20, such as by welding, while the lower links 144 and 146 are removably attached by the pins 150 and 154. Alternatively, the forked brackets 152 may be removably attached to the upright channels 18 and 20 by a plurality of bolts (not shown).

It should also be noted that in FIG. 6, additional rollers 156 (one of which is shown) are attached to the outer surfaces of the side plate 74 and 76 and abut against the flanges of the upright channels 18 and 20. The additional rollers 156 serve the same purpose as the guide rollers 94, 96, 98 and 100 while also preventing the support frame 66 from tilting in the horizontal plane relative to the upright channels 18 and 20. It should also be noted that in FIG. 6 to complete the mounting of an implement, an upper link (not shown) may be pivotally connected to a clevis 158 formed on a cross bar 160 which spans the side plates 74 and 76. The cross bar 160 can be permanently attached to an upper portion of the side plates 74 or 76, such as by welding, or it can be removably attached thereto such as by bolts. In actual operation, when it is desired to raise the lower links 144 and 146 so as to raise the implement, the four-way valve 54 is set in its fourth position which enables the piston rods 30 and 32 to move downwards. As the pin points 150 move downwards, the lower links 144 and 146 will pivot about the pivot pins 154 thereby allowing the forward ends of the lower links 144 and 146 to move upwards. In order to lower the implement, the four-way valve 54 is moved to its first position which causes the piston rods 30 and 32 to move upwards into the hydraulic cylinders 26 and 28. This motion causes a reverse action whereby the pin points 150 will move upwards thereby allowing the lower links 144 and 146 to pivot about the pins 154 and move the forward end of the implement downwards.

It will typically be found desirable to move the hydraulic cylinders 26 and 28 to a lower position relative to the upright channels 18 and 20 for attachment of the lower links 144 and 146, as can be seen by comparing FIGS. 1 and 6. This is readily achieved by providing upper and lower sets of the apertures 46 in the upright channels 18 and 20 so as to receive the pins 42 and 44 which are used to anchor the upper ends of the cylinders 26 and 28 to the channels 18 and 20. As is well known to those skilled in the art, additional sets of apertures 46 can be formed in the flanges of the channel members 18 and 20 to provide a broader range for the positions of the cylinders 26 and 28.

Although the preferred cylinder arrangement is shown wherein the hydraulic cylinders 26 and 28 have the piston rods 30 and 32 extending downward therefrom, it is also possible to invert the hydraulic cylinders 26 and 28 such that the piston rods 30 and 32 extend upwards. In addition, it is also possible to anchor the lower ends of the cylinders 26 and 28 and to connect the top ends to either the ballast weight assembly 16 or to the lower links 144 and 146 via direction-reversing cables or chains passing over pulleys or sprockets at the top of the upright channels 18 and 20. Such embodiments are viewed as being encompassed within the scope of this invention. It should also be noted that although the arrangement has been shown mounted to the front of a tractor, it is not restricted to such a position. The apparatus 14 may be alternatively or additionally used at the rear or even the side of the vehicle especially one having a rotation cab platform.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A tractor-mounted apparatus for supporting ballast weights thereon and for vertically raising and lowering said weights relative to the ground, said apparatus comprising:
    (a) a pair of U-shaped channels fastened to frame members of said tractor in an upright position and which are aligned opposite to one another for receiving said ballast weights therebetween;
    (b) a support frame capable of holding said ballast weights, said support frame having two pairs of spaced apart rollers which contact outer side surfaces of said U-shaped channels and which guide said support frame while moving vertically on said channels;
    (c) a pair of hydraulic cylinders each secured at one end to one of said U-shaped channels and each having an outwardly extending piston rod detachably coupled at an outer end to opposite sides of said support frame;
    (d) locking means for affixing said support frame to said U-shaped channels in at least one vertical position and for enabling detachment of said hydraulic cylinders from said support frame so that said outwardly extending piston rods can be attached to an implement; and
    (e) control means for moving said piston rods into and out of said hydraulic cylinders thereby raising and lowering said ballast weights or attached implement with respect to the ground in a substantially vertical fashion.

2. The tractor-mounted apparatus of claim 1 wherein each of said U-shaped channels contain a plurality of vertically spaced apertures formed in its sidewalls which are capable of receiving a pin affixed to an upper end of each of said hydraulic cylinders for retaining said cylinders at different height positions.

3. The tractor-mounted apparatus of claim 1 wherein a pair of brackets are secured to a lower portion of each of said U-shaped channels, said brackets including means for pivotally attaching arms of an implement thereto, said arms further being attached at their inner ends to said piston rods such that movement of said piston rods out of said hydraulic cylinders raises said implement and movement of said piston rods into said hydraulic cylinders lowers said implement.

4. The tractor-mounted apparatus of claim 1 wherein a cross bar is secured to said support frame above said weights, said cross bar having a clevis affixed thereto for providing an attachment point for an upper link of a three-point hitch.

5. The tractor-mounted apparatus of claim 1 wherein a yoke is attachable to said support frame for retaining additional weight thereon.

6. The tractor mounted apparatus of claim 5 wherein a hitch member is fixed to said yoke.

7. A tractor-mounted apparatus capable of supporting ballast weights on said tractor and for alternatively raising and lowering either said ballast weights or an attached implement relative to the ground, said apparatus comprising:
    (a) a pair of U-shaped channels fastened to frame members of said tractor in an upright position and which are aligned opposite to one another for receiving said ballast weights therebetween;
    (b) a support frame capable of holding said ballast weights, said support frame having two pairs of spaced apart rollers which contact outer side surfaces of said U-shaped channels and guide said support frame for vertical movement on said channels;
    (c) a pair of hydraulic cylinders each secured at one end to one of said U-shaped channels and each having an outwardly extending piston rod detachably coupled to an outer end to opposite sides of said support frame;
    (d) locking means for affixing said support frame to said U-shaped channels in at least one vertical position and for enabling detachment of said hydraulic cylinders from said support frame so that said outwardly extending piston rods can be attached to an implement; and
    (e) control means for moving said piston rods into and out of said hydraulic cylinders thereby raising and lowering said ballast weights or attached implement with respect to the ground in a substantially vertical fashion, said control means including a a four-way valve and a two-way valve arranged such that when both valves are in a first position said weight is lowered, when said four-way valve is in a second position and said two-way valve is in a second position said hydraulic cylinders are connected to said weights to provide a hydraulic damping effect to said tractor, when said four-way valve is in a third position and said two-way valve is in a first position said weight is hydraulically locked in place relative to said frame members of said tractor, and when said four-way valve is in a fourth position and said two-way valve is in a first position said weight is raised.

8. A tractor-mounted apparatus capable of supporting ballast weights on said tractor and for alternatively raising and lowering either said ballast weights or an attached implement relative to the ground, said apparatus comprising:
    (a) a pair of U-shaped channels fastened to frame members of said tractor in an upright position and which are aligned opposite to one another for receiving said ballast weights therebetween;
    (b) a support frame capable of holding said ballast weights, said support frame having two pairs of spaced apart rollers which contact outer side surfaces of said U-shaped channels and which guide said support frame while moving vertically on said channels;

(c) a pair of hydraulic cylinders each secured at one end to one of said U-shaped channels and each having an outwardly extending piston rod detachably coupled at an outer end to opposite sides of said support frame; and (d) control means for moving said piston rods into and out of said hydraulic cylinders thereby raising and lowering said ballast weights or attached implement with respect to the ground in a substantially vertical fashion, said control means including a four-way four position valve connected between a pressure source and both hydraulic cylinders, a first fluid line connecting rod chambers of said hydraulic cylinders to said four-way valve, a second fluid line connecting head chambers of said hydraulic cylinders to said four-way valve, a two-way two position valve connected to said first line, a throttle valve located downstream of said two-way valve and an accumulator located downstream of said throttle valve, said control means functioning to lower said weights relative to the ground when both said four-way and two-way valves are in a first position, to provide a hydraulic damping effect to said tractor when both said four-way and two-way valves are in a second position, to provide a hydraulic lock on said weights when said four-way valve is in a third position and said two-way valve is in a first position, and to raise said weights relative to the ground when said four-way valve is in a fourth position and said two-way valve is in a first position.

9. The tractor-mounted apparatus of claim 8 wherein said throttle device is adjustable.

10. The tractor-mounted apparatus of claim 8 wherein said lift cylinder is double acting.

* * * * *